US007759428B1

(12) United States Patent
Wang et al.

(10) Patent No.: US 7,759,428 B1
(45) Date of Patent: Jul. 20, 2010

(54) CONJUGATED HETEROARYL-CONTAINING POLYMERS

(75) Inventors: Hailiang Wang, Camarillo, CA (US); Gang Yu, Santa Barbara, CA (US)

(73) Assignee: DuPont Displays, Inc., Santa Barbara, CA (US)

( * ) Notice: Subject to any disclaimer, the term of this patent is extended or adjusted under 35 U.S.C. 154(b) by 1237 days.

(21) Appl. No.: 11/312,809

(22) Filed: Dec. 20, 2005

Related U.S. Application Data

(60) Provisional application No. 60/694,883, filed on Jun. 28, 2005, provisional application No. 60/640,888, filed on Dec. 30, 2004.

(51) Int. Cl.
*C08G 75/06* (2006.01)
*C08F 283/00* (2006.01)
*C08L 81/00* (2006.01)

(52) U.S. Cl. ............... 525/328.5; 525/535; 528/373; 528/377; 428/690; 428/917

(58) Field of Classification Search ............ 525/328.5, 525/535; 528/373, 377; 428/690, 917
See application file for complete search history.

(56) References Cited

U.S. PATENT DOCUMENTS

| | | | |
|---|---|---|---|
| 4,640,748 A | 2/1987 | Wudl et al. | 204/59 |
| 4,808,681 A | 2/1989 | Harper et al. | 526/270 |
| 5,274,058 A | 12/1993 | Ferraris et al. | 526/256 |
| 5,425,125 A | 6/1995 | Holmes et al. | 385/143 |
| 5,510,457 A | 4/1996 | Chen et al. | 528/378 |
| 5,523,555 A | 6/1996 | Friend et al. | 250/214 |
| 5,599,899 A | 2/1997 | Jenekhe et al. | 528/337 |
| 5,834,575 A | 11/1998 | Honda et al. | 526/256 |
| 5,945,502 A | 8/1999 | Hsieh et al. | 528/101 |
| 6,303,238 B1 | 10/2001 | Thompson et al. | 428/690 |
| 6,413,658 B1 | 7/2002 | Araki | 428/690 |
| 2001/0019782 A1 | 9/2001 | Igarashi et al. | 428/690 |
| 2003/0088050 A1 | 5/2003 | Spreitzer et al. | 528/86 |

FOREIGN PATENT DOCUMENTS

| | | |
|---|---|---|
| EP | 1 191 612 A2 | 3/2002 |
| EP | 1 191 614 A2 | 3/2002 |
| WO | WO 00/70655 | 11/2000 |
| WO | WO 01/41512 A1 | 6/2001 |
| WO | WO 02/02714 A2 | 1/2002 |
| WO | WO 02/15645 A1 | 2/2002 |

OTHER PUBLICATIONS

Campbell, I.H. et al., "Excitation Transfer Processes in a Phosphor-Doped Poly (p-phenylene vinylene) Light-Emitting Diode", *Physical Review. B.*, vol. 65, 085210-1-085210-8.
Gilch, H.G. et al., "Polymerization of α-Halogenated p-Xylenes with Base", *Journal of Polymer Science, Part A: 1 Polym Chem*, 1966, 4, 1337-1349.
Gustafsson, G. et al., Flexible Light-Emitting Diodes made from Soluble Conducting Polymer, *Nature*, 1992, 357, 477-479.
Markus, J., *Electronics and Nucleonics Dictionary*, 1966, 3rd Edition, 470 and 476.
O'Brien, D.F., et al., "Electrophosphoresence from a Doped Polymer Light Emitting Diode", *Synthetic Metals*, 2001, 116, (1-3), 379-383.
Othmer, K., *Encyclopedia of Chemical Technology*, 1996, 4th edition, 18, 837-860.
Wittig, G. et al., "Triphenyl-Phosphin-Methylene", *Ber.*, 1955, 88, 1654-1667.
Witting, G. et al., "Triphenyl-Phosphin-Methylene", *Ber.*, 1954, 87, 1318-1331.

*Primary Examiner*—Duc Truong
(74) *Attorney, Agent, or Firm*—Woodcock Washburn LLP

(57) ABSTRACT

Provided are polymers having pheneylenevinylene units and heteroarylene vinylene units, and methods for making and using the same. Additionally, there are provided heteroarylenevinylene polymers. The polymers are useful in organic electronic devices.

2 Claims, 9 Drawing Sheets

CONJUGATED HETEROARYL-CONTAINING POLYMERS

CROSS REFERENCE

This application claims benefit to U.S. Provisional Application Ser. Nos. 60/640,888 filed Dec. 30, 2004 and 60/694,883 filed Jun. 28, 2005, the disclosures of which are incorporated herein by reference in their entireties.

FIELD

Polymers having heteroaryl units, and their use in organic electronic devices, and materials and methods for fabrication of the same.

BACKGROUND

Organic electronic devices convert electrical energy into radiation, detect signals through electronic processes, convert radiation into electrical energy, or include one or more organic semiconductor layers. Organic electronic devices are manufactured in layers, and at least one layer is a photoactive layer. This layer is critical for device performance.

Thus, what is needed are new photoactive compositions and methods.

SUMMARY

Provided are polymers, comprising units of Formulae I and II:

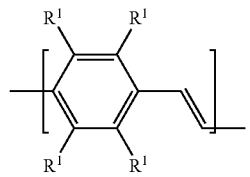

I

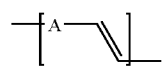

II wherein:

$R^1$ is, independently at each occurrence, H, alkyl, cycloalkyl, alkenyl, alkynyl, alkoxy, thioalkyl, aminoalkyl, oxyalkylene, aryl, arylalkyl, or alkylaryl; and A is heteroaryl, wherein A has at least one S; methods for making and using the same; and compositions, organic electronic devices, and articles useful in the manufacture of organic electronic devices, comprising polymers and/or mixtures of polymers.

Also provided are polymers comprising units of Formula II:

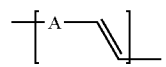

II wherein:

A is heteroaryl containing at least one S and is substituted with at least one alkoxy; methods for making and using the same; and compositions, organic electronic devices, and articles useful in the manufacture of organic electronic devices, comprising polymers and/or mixtures of polymers.

BRIEF DESCRIPTION OF THE DRAWINGS

Embodiments are illustrated in the accompanying figures to improve understanding of concepts as presented herein.

Figure 1:
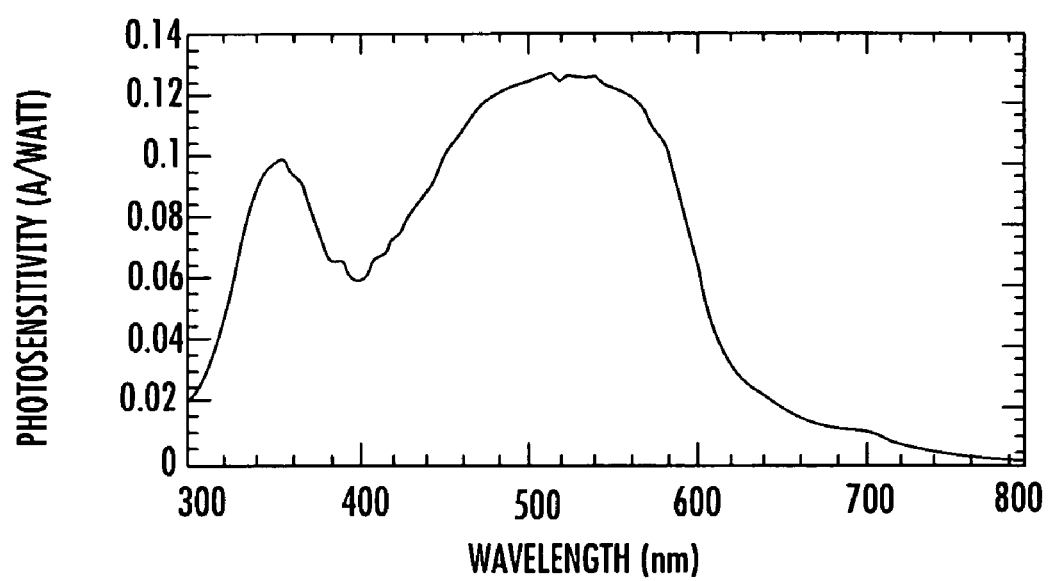
FIG. 1 illustrates the spectral response of a photodiode fabricated with a conjugated copolymer.

The figures are provided by way of example and are not intended to limit the invention. Skilled artisans appreciate that objects in the figures are illustrated for simplicity and clarity and have not necessarily been drawn to scale. For example, the dimensions of some of the objects in the figures may be exaggerated relative to other objects to help to improve understanding of embodiments.

DETAILED DESCRIPTION

Provided are polymers comprising units of Formulae I and II:

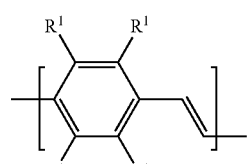

I

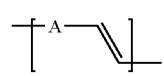

II wherein:

$R^1$ is, independently at each occurrence, H, alkyl, cycloalkyl, alkenyl, alkynyl, alkoxy, thioalkyl, aminoalkyl, oxyalkylene, aryl, arylalkyl, or alkylaryl; and A is heteroaryl, wherein A has at least one S.

In one embodiment, A is substituted with at least one $R^2$, wherein $R^2$ is, independently at each occurrence, H, alkyl, alkenyl, alkynyl, cycloalkyl, alkoxy, thioalkyl, aminoalkyl, oxyalkylene, aryl, arylalkyl, or alkylaryl.

In one embodiment, A is substituted with at least one alkoxy.

In one embodiment, the polymer is a random, block, graft, or alternating copolymer.

In one embodiment, Formula I has Formula III:

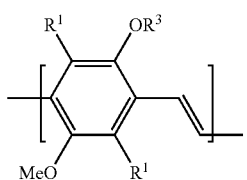

III wherein $R^3$ is 5-20 carbon alkyl.

In one embodiment, A is:

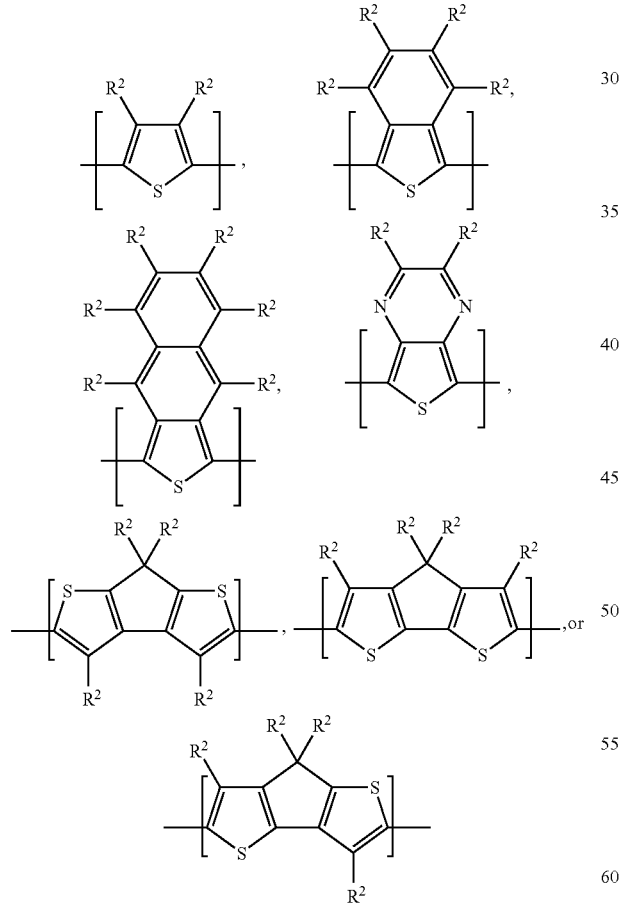

wherein:
$R^2$ is, independently at each occurrence, H, alkyl, alkenyl, alkynyl, cycloalkyl, alkoxy, thioalkyl, aminoalkyl, oxyalkylene, aryl, arylalkyl, or alkylaryl.

In one embodiment, A is:

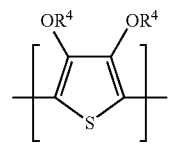

wherein:
$R^4$ is, independently at each occurrence, 5-20 carbon alkyl.

In one embodiment, the Formula I to Formula II ratio ranges from 1000:1 to 1:1000. In one embodiment, the Formula I to Formula II ratio ranges from 100:1 to 1:100. In one embodiment, the Formula I to Formula II ratio ranges from 10:1 to 1:10.

In one embodiment, A is a thiophene. In one embodiment the polymer is selected from a random copolymer, poly-(2-methoxy-5-(3,7-dimethyloctyloxy)-phenylenevinylene-co-dihexyloxythiophenevinylene) and/or an alternating copolymer, poly(2-methoxy-5-(3,7-dimethyloctyloxy)-phenylenevinylene-co-thiophenevinylene), shown below:

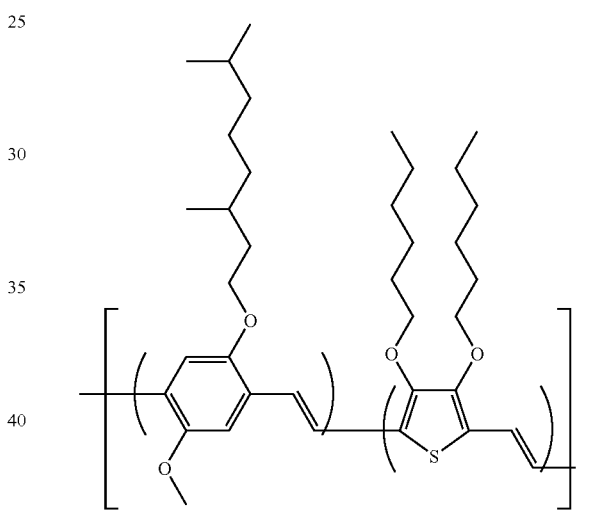

poly-(2-methoxy-5-(3,7-dimethyloctyloxy)-phenylenevinylene-co-dihexyloxythiophenevinylene)

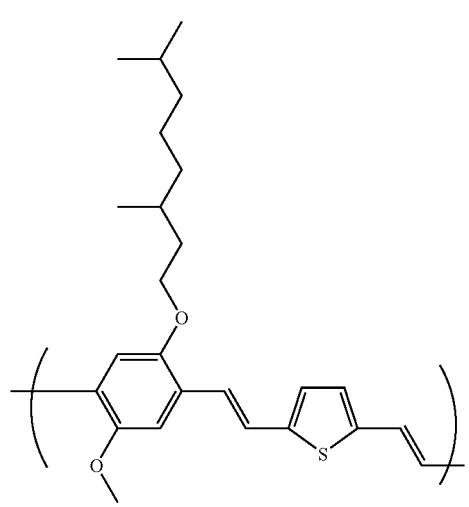

poly-(2-methoxy-5(3,7-dimethyloctyloxy)-phenyle-
nevinylene-co-thiophenevinylene)

In one embodiment, the polymer is poly-(2-methoxy-5-(3,
7-methyloctyloxy)-phenylenevinylene-co-dihexylox-
ythiophenevinylene). In one embodiment, the polymer is
poly(2-methoxy-5(3,7-dimethyloctyloxy)-phenylenevi-
nylene-co-thiophenevinylene.

Also provided are polymers comprising units of Formula
II:

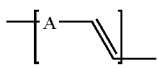
II wherein:
A is heteroaryl containing at least one S and is substituted
with at least one alkoxy.

In one embodiment, A is substituted with at least one $R^2$,
wherein $R^2$ is, independently at each occurrence, H, alkyl,
alkenyl, alkynyl, cycloalkyl, alkoxy, thioalkyl, aminoalkyl,
oxyalkylene, aryl, arylalkyl, or alkylaryl.

In one embodiment, A is:

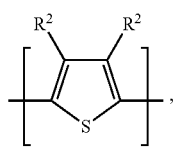
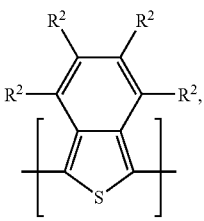
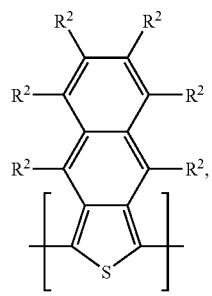
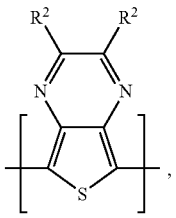
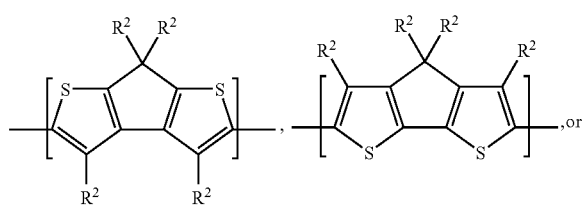
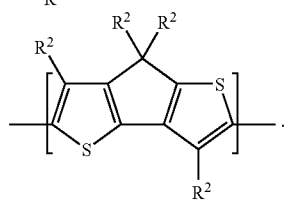

In one embodiment, A is:

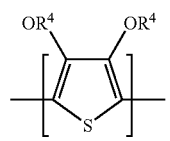

wherein:
$R^4$ is, independently at each occurrence, 5-20 carbon alkyl.

In one embodiment, the polymer is a homopolymer and the
homopolymer is poly(dihexyloxythiophenevinylene) having
the structure below:

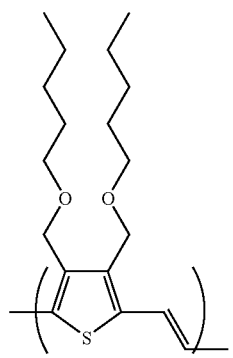

In one embodiment, the polymer is poly(dihexylox-
ythiophenevinylene).

Also provided are compositions comprising (1) polymer
units of Formulae I and II:

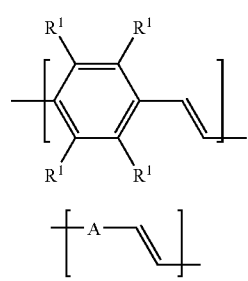
I

II wherein:
$R^1$ is, independently at each occurrence, H, alkyl,
cycloalkyl, alkenyl, alkynyl, alkoxy, thioalkyl, aminoalkyl,
oxyalkylene, aryl, arylalkyl, or alkylaryl; and
A is heteroaryl, wherein A has at least one S; or (2) units of
Formula II:

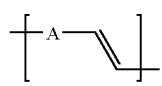
II wherein:

A is heteroaryl containing at least one S and is substituted with at least one alkoxy; or (3) mixtures thereof.

Provided are organic electronic devices comprising at least one active layer comprising (1) polymer units of Formulae I and II:

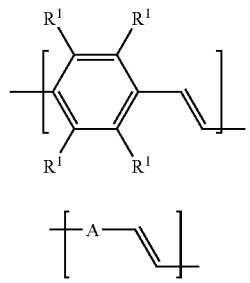

I

II wherein:

R[1] is, independently at each occurrence, H, alkyl, cycloalkyl, alkenyl, alkynyl, alkoxy, thioalkyl, aminoalkyl, oxyalkylene, aryl, arylalkyl, or alkylaryl; and A is heteroaryl, wherein A has at least one S; or (2) units of Formula II:

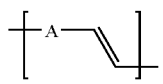

II wherein:

A is heteroaryl containing at least one S and is substituted with at least one alkoxy; or (3) mixtures thereof.

Provided are articles useful in the manufacture of organic electronic devices comprising (1) polymer units of Formulae I and II:

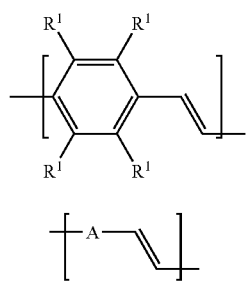

I

II wherein:

R[1] is, independently at each occurrence, H, alkyl, cycloalkyl, alkenyl, alkynyl, alkoxy, thioalkyl, aminoalkyl, oxyalkylene, aryl, arylalkyl, or alkylaryl; and A is heteroaryl, wherein A has at least one S; or (2) units of Formula II:

II wherein:

A is heteroaryl containing at least one S and is substituted with at least one alkoxy; or (3) mixtures thereof.

Methods

The polymers can be random copolymers or alternating copolymers, graft polymers, or block polymers, depending primarily on the polymerization mechanism. For example, the Wittig reaction (G. Wittig, U. Schollkopf, Ber. 1954, 87, 1318; G Wittig, W. Haag, Ber. 1955, 88, 1654) can be used to provide copolymers, as set forth in Scheme 1, in which a thiophene is used as an example of A.

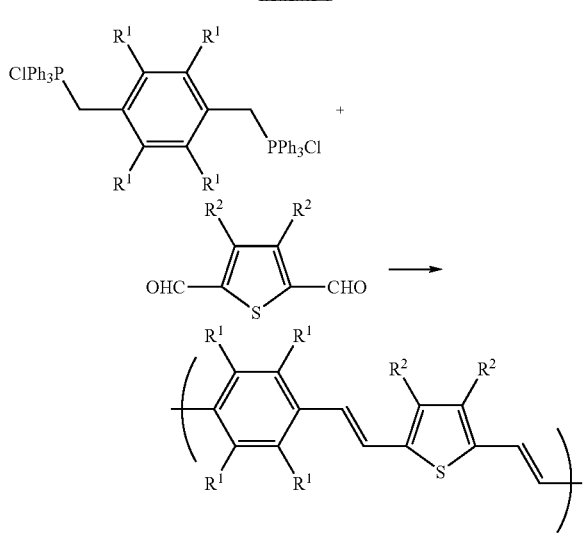

Scheme 1

As shown in Scheme 1, typical monomers utilized to prepare a copolymer include a para-xylenebis(triphenylphosphonium chloride) and a 2,5-thiophenedialdehyde. In one embodiment, for the preparation of an alternating copolymer, each unit is present in the reaction mixture in about equal mole percentages.

The polymerization reaction is typically carried out in the presence of a base in a suitable solvent. Reaction solvents suitable for use in the polymerization reaction include any organic solvent that can dissolve the monomer and resulting polymer. In addition, suitable solvents are insensitive to the base. Examples of suitable solvents include, for example, tetrahydrofuran (THF), dimethylformamide (DMF), dimethylacetamide (DMAc), chloroform, ethanol, and the like, and mixtures thereof.

Bases contemplated for use include, for example, alkali metal alkoxides, such as lithium or potassium tert-butoxide. Bases may be introduced to the reaction mixture either in the solid state or in solution.

The polymerization reaction proceeds at room temperature or higher temperature if needed. The reaction time typically ranges from 12 hours to about 24 hours.

After the polymerization reaction substantially proceeded, the crude polymer is precipitated from the reaction mixture by addition of an excess amount of methanol. Isolation can be achieved by filtration.

The crude polymer is purified by dissolution in THF. Filtration of the solution through a 5 µm filter and precipitation using an excess of water is performed. The purified polymer is isolated and washed using alternative aliquots of water and methanol. The polymer can be dried in vacuo.

The band gaps of the copolymers can be readily controlled by appropriate choice of substituent. In general, the band gap decreases with the addition of alkoxygroups. For example, when the $R^2$ substituents include hydrogen, $-OC_{10}H_{21}$, $-OCH_3$, and the like, the band gap for the copolymer of poly(phenylenevinylene)-co-(thiophenevinylene) is around 620 nm. When $R^2$ substituents such as $-OC_6H_{13}$ are added to the thiophene ring, the band gap is around 650 nm.

Copolymers can be prepared using the Gilch polymerization (H. G. Gilch, W. L. Wheelwright, *J. Polym. Sci., Part A: Polym. Chem.* 1966, 4, 1337), set forth in Scheme 2.

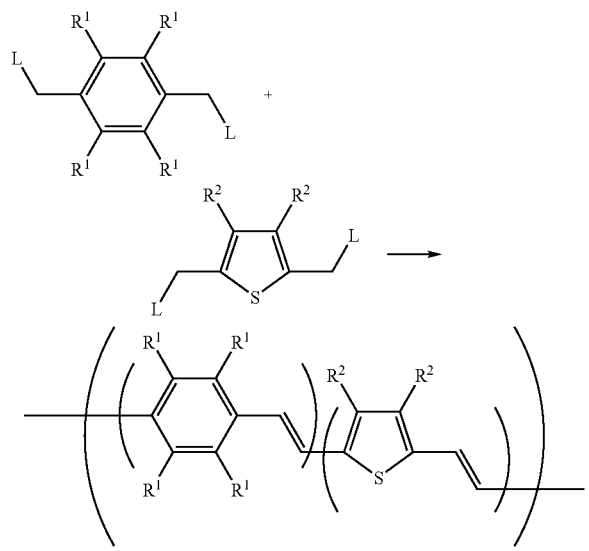

Scheme 2

In Scheme 2 above, L is a leaving group, such as, for example, —Cl, —Br, —S(CO)Ph, and the like. In one embodiment, to prepare random poly(phenylenevinylene)-co-(thiophenevinylene), the monomer ratio present in the reaction mixture will be a ratio other than 1:1.

Reaction solvents suitable for use in this process include organic solvents that can dissolve the monomers and resulting polymers. Suitable reaction solvents are also insensitive to the base used in the Gilch polymerization. Examples of suitable solvents include THF, toluene, xylene, and the like. In one embodiment, the reaction solvent is THF. In certain embodiments, the base used in the Gilch polymerization is potassium tert-butoxide, either in solid state or 1M solution in THF. The polymerization reaction proceeds at room temperature.

Higher temperature may be used. Preferably the reaction proceeds from 1 to 2 hours.

After the polymerization reaction substantially proceeded, the crude polymer is precipitated from the reaction mixture by addition of an excess amount of methanol. Isolation can be achieved by filtration.

The crude polymer is purified by dissolution in THF. Filtration of the solution through a 5 µm filter and precipitation using an excess of water is performed. The purified polymer is isolated and washed using alternative aliquots of water and methanol. The polymer can be dried in vacuo.

The degree of polymerization depends on reaction temperature, concentration of the monomers in the reaction mixture, and reaction time. A longer polymerization time will usually result in a polymer that is insoluble in common organic solvents. By optimizing the reaction conditions, a soluble conjugated polymer can be obtained.

To prepare homopolymers, a monomer (such as, e.g., 3,4-dialkoxy-2,5-di(phenylsulfinylmethyl)-thiophene) is added to the reaction mixture along with 4 equivalents of a suitable base. Reaction solvents suitable for use in this process include organic solvent that can dissolve the monomer and resulting polymer. Suitable reaction solvents are also insensitive to the base chosen for use in the Gilch polymerization. Examples of suitable solvents include THF, toluene, xylene, and the like. Preferably, the base used in this process is potassium tert-butoxide either in solid state or 1 M solution in THF. The polymerization reaction proceeds at room temperature. Preferably the reaction proceeds for about 10 hours to 14 hours.

The crude polymer can be obtained by precipitation of the reaction mixture from methanol and isolation.

The crude polymer is purified by dissolution in THF. Filtration of the solution through a 5 µm filter and precipitation using an excess of water is performed. The purified polymer is isolated and washed using alternative aliquots of water and methanol. The polymer can be dried in vacuo.

As set forth herein, the polymers are useful as active layers in organic electronic devices.

Because these polymers are soluble in common organic solvents, e.g., THF, toluene, xylene, and the like, optical quality, pinhole-free thin films can be fabricated on rigid or flexible substrates such as glasses, plastics and silicon by any liquid deposition technique. The term "film" refers to a coating covering a desired area. The area can be as large as an entire display, or as small as a single sub-pixel. Typical liquid deposition techniques include, but are not limited to, continuous deposition techniques such as spin coating, gravure coating, curtain coating, dip coating, slot-die coating, spray-coating, and continuous nozzle coating; and discontinuous deposition techniques such as ink jet printing, gravure printing, and screen printing. Non-limiting examples of suitable plastic substrates include polyesters, polystyrenes, polycarbonates, polyolefins, polyimides, and the like.

In one embodiment, the polymer is dissolved in toluene or tetrachloroethane. For film deposition, the concentration of the solution is from about 10-50 mg/ml, and typically about 30 mg/ml. Generally, the polymer may be dissolved in the solvent at room temperature.

To prepare the polymer solution, the polymer is stirred in the selected solvent at room temperature. After a clear solution is formed, it is filtered through a 1 μm filter. Pinhole-free, uniform films can be obtained, for example, by spin-coating the solution at room temperature. Preferably, the spin speed is in the range of about 400 rpm to 5,000 rpm. High quality films with thicknesses ranging from about 300 Å to about 5,000 Å can be obtained by varying the spin speed and the concentration of the solution. Large area films with thickness ranging from about 0.03 μm to about 20 μm can be prepared, for example, by dip coating.

Many aspects and embodiments have been described above and are merely exemplary and not limiting. After reading this specification, skilled artisans appreciate that other aspects and embodiments are possible without departing from the scope of the invention.

Device

Figure 9:
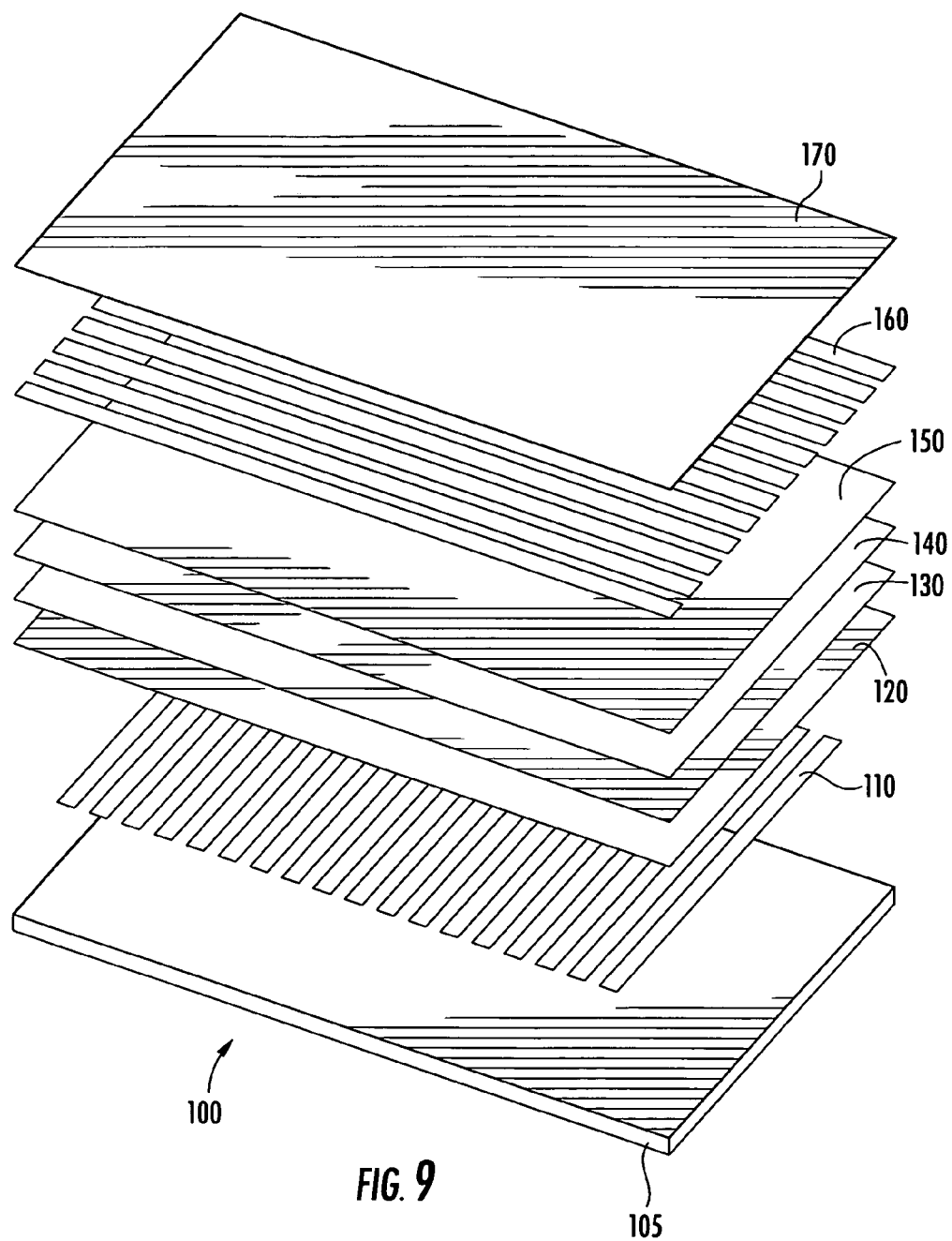
FIG. 9 is a schematic diagram of an organic electronic device.

Referring to FIG. 9, an exemplary organic electronic device 100 is shown. The device 100 includes a substrate 105. The substrate 105 may be rigid or flexible, for example, glass, ceramic, metal, or plastic. When voltage is applied, emitted light is visible through the substrate 105.

A first electrical contact layer 110 is deposited on the substrate 105. For illustrative purposes, the layer 110 is an anode layer. Anode layers may be deposited as lines. The anode can be made of, for example, materials containing or comprising metal, mixed metals, alloy, metal oxides or mixed-metal oxide. The anode may comprise a conducting polymer, polymer blend, or polymer mixtures. Suitable metals include the Group 11 metals, the metals in Groups 4, 5, and 6, and the Group 8, 10 transition metals. If the anode is to be light-transmitting, mixed-metal oxides of Groups 12, 13 and 14 metals, such as indium-tin-oxide, are generally used. The anode may also comprise an organic material, especially a conducting polymer such as polyaniline, including exemplary materials as described in *Flexible Light-Emitting Diodes Made From Soluble Conducting Polymer*, Nature, Vol. 357, pp 477-479 (11 Jun. 1992). At least one of the anode and cathode should be at least partially transparent to allow the generated light to be observed.

An optional buffer layer 120, such as hole transport materials, may be deposited over the anode layer 110, the latter being sometimes referred to as the "hole-injecting contact layer." Examples of hole transport materials suitable for use as the layer 120 have been summarized, for example, in Kirk Othmer, *Encyclopedia of Chemical Technology, Fourth Edition*, 1996, 18, 837-860. Both hole transporting "small" molecules as well as oligomers and polymers may be used. Hole transporting molecules include, but are not limited to: N,N' diphenyl-N,N'-bis(3-methylphenyl)-[1,1'-biphenyl]-4,4'-diamine (TPD), 1,1 bis[(di-4-tolylamino) phenyl]cyclohexane (TAPC), N,N' bis(4-methylphenyl)-N,N'-bis(4-ethylphenyl)-[1,1'-(3,3'-dimethyl)biphenyl]-4,4'-diamine (ETPD), tetrakis (3-methylphenyl)-N,N,N',N'-2,5-phenylenediamine (PDA), a-phenyl 4-N,N-diphenylaminostyrene (TPS), p (diethylamino)benzaldehyde diphenylhydrazone (DEH), triphenylamine (TPA), bis[4 (N,N-diethylamino)-2-methylphenyl](4-methylphenyl)methane (MPMP), 1 phenyl-3-[p-(diethylamino)styryl]-5-[p-(diethylamino)phenyl]pyrazoline (PPR or DEASP), 1,2 trans-bis(9H-carbazol-9-yl)cyclobutane (DCZB), N,N,N',N' tetrakis(4-methylphenyl)-(1,1'-biphenyl)-4,4'-diamine (TTB), and porphyrinic compounds, such as copper phthalocyanine. Useful hole transporting polymers include, but are not limited to, polyvinylcarbazole, (phenylmethyl)polysilane, and polyaniline. Conducting polymers are useful as a class. It is also possible to obtain hole transporting polymers by doping hole transporting moieties, such as those mentioned above, into polymers such as polystyrenes and polycarbonates.

An organic layer 130 may be deposited over the buffer layer 120 when present, or over the first electrical contact layer 110. In some embodiments, the organic layer 130 may be a number of discrete layers comprising a variety of components. Depending upon the application of the device, the organic layer 130 can be a light-emitting layer that is activated by an applied voltage (such as in a light-emitting diode or light-emitting electrochemical cell), or a layer of material that responds to radiant energy and generates a signal with or without an applied bias voltage (such as in a photodetector).

Other layers in the device can be made of any materials which are known to be useful in such layers upon consideration of the function to be served by such layers.

Any organic electroluminescent ("EL") material can be used as a photoactive material (e.g., in layer 130). Such materials include, but are not limited to, fluorescent dyes, small molecule organic fluorescent compounds, fluorescent and phosphorescent metal complexes, conjugated polymers, polymers described above, and mixtures thereof. Examples of fluorescent dyes include, but are not limited to, pyrene, perylene, rubrene, derivatives thereof, and mixtures thereof. Examples of metal complexes include, but are not limited to, metal chelated oxinoid compounds, such as tris(8-hydroxyquinolato)aluminum (Alq3); cyclometalated iridium and platinum electroluminescent compounds, such as complexes of iridium with phenylpyridine, phenylquinoline, or phenylpyrimidine ligands as disclosed in Petrov et al., Published PCT Application WO 02/02714, and organometallic complexes described in, for example, published applications US 2001/0019782, EP 1191612, WO 02/15645, and EP 1191614; and mixtures thereof. Electroluminescent emissive layers comprising a charge carrying host material and a metal complex have been described by Thompson et al., in U.S. Pat. No. 6,303,238, and by Burrows and Thompson in published PCT applications WO 00/70655 and WO 01/41512. Examples of conjugated polymers include, but are not limited to poly(phenylenevinylenes), polyfluorenes, poly(spirobifluorenes), polythiophenes, poly(p-phenylenes), copolymers thereof, polymers described above, and mixtures thereof.

In one embodiment, photoactive material can be an organometallic complex. In another embodiment, the photoactive material is a cyclometalated complex of iridium or platinum. Other useful photoactive materials may be employed as well. Complexes of iridium with phenylpyridine, phenylquinoline, or phenylpyrimidine ligands have been disclosed as electroluminescent compounds in Petrov et al., Published PCT Application WO 02/02714. Other organometallic complexes have been described in, for example, published applications US 2001/0019782, EP 1191612, WO 02/15645, and EP 1191614. Electroluminescent devices with an active layer of polyvinyl carbazole (PVK) doped with metallic complexes of iridium have been described by Burrows and Thompson in published PCT applications WO 00/70655 and WO 01/41512. Electroluminescent emissive layers comprising a charge carrying host material and a phosphorescent platinum complex have been described by Thompson et al., in U.S. Pat. No. 6,303,238, Bradley et al., in *Synth. Met.* 2001, 116 (1-3), 379-383, and Campbell et al., in *Phys. Rev. B*, Vol. 65 085210.

A second electrical contact layer 160 is deposited on the organic layer 130. For illustrative purposes, the layer 160 is a cathode layer.

Cathode layers may be deposited as lines or as a film. The cathode can be any metal or nonmetal having a lower work function than the anode. Exemplary materials for the cathode can include alkali metals, especially lithium, the Group 2 (alkaline earth) metals, the Group 12 metals, including the rare earth elements and lanthanides, and the actinides. Materials such as aluminum, indium, calcium, barium, samarium and magnesium, as well as combinations, can be used. Lithium-containing and other compounds, such as LiF and $Li_2O$, may also be deposited between an organic layer and the cathode layer to lower the operating voltage of the system.

An electron transport layer 140 or electron injection layer 150 is optionally disposed adjacent to the cathode, the cathode being sometimes referred to as the "electron-injecting contact layer."

An encapsulation layer 170 is deposited over the contact layer 160 to prevent entry of undesirable components, such as water and oxygen, into the device 100. Such components can have a deleterious effect on the organic layer 130. In one embodiment, the encapsulation layer 170 is a barrier layer or film.

Though not depicted, it is understood that the device 100 may comprise additional layers. For example, there can be a layer (not shown) between the anode 110 and hole transport layer 120 to facilitate positive charge transport and/or bandgap matching of the layers, or to function as a protective layer. Other layers that are known in the art or otherwise may be used. In addition, any of the above-described layers may comprise two or more sub-layers or may form a laminar structure. Alternatively, some or all of anode layer 110 the hole transport layer 120, the electron transport layers 140 and 150, cathode layer 160, and other layers may be treated, especially surface treated, to increase charge carrier transport efficiency or other physical properties of the devices. The choice of materials for each of the component layers is preferably determined by balancing the goals of providing a device with high device efficiency with device operational lifetime considerations, fabrication time and complexity factors and other considerations appreciated by persons skilled in the art. It will be appreciated that determining optimal components, component configurations, and compositional identities would be routine to those of ordinary skill of in the art.

In one embodiment, the different layers have the following range of thicknesses: anode 110, 500-5000 Å, in one embodiment 1000-2000 Å; hole transport layer 120, 50-2000 Å, in one embodiment 200-1000 Å; photoactive layer 130, 10-2000 Å, in one embodiment 100-1000 Å; layers 140 and 150, 50-2000 Å, in one embodiment 100-1000 Å; cathode 160, 200-10000 Å, in one embodiment 300-5000 Å. The location of the electron-hole recombination zone in the device, and thus the emission spectrum of the device, can be affected by the relative thickness of each layer. Thus the thickness of the electron-transport layer should be chosen so that the electron-hole recombination zone is in the light-emitting layer. The desired ratio of layer thicknesses will depend on the exact nature of the materials used.

In operation, a voltage from an appropriate power supply (not depicted) is applied to the device 100. Current therefore passes across the layers of the device 100. Electrons enter the organic polymer layer, releasing photons. In some OLEDs, called active matrix OLED displays, individual deposits of photoactive organic films may be independently excited by the passage of current, leading to individual pixels of light emission. In some OLEDs, called passive matrix OLED displays, deposits of photoactive organic films may be excited by rows and columns of electrical contact layers.

Devices can be prepared employing a variety of techniques. These include, by way of non-limiting exemplification, vapor deposition techniques and liquid deposition.

Other features and benefits of any one or more of the embodiments will be apparent from the detailed description, and from the claims. Some terms are defined or clarified below.

DEFINITIONS

As used herein, the term "group" is intended to mean a part of a compound, such as a substituent in an organic compound. Unless otherwise indicated, all groups can be linear, branched or cyclic, where possible. Unless otherwise indicated, all groups can be unsubstituted or substituted. Substituted groups may have one or more substituents selected from hydroxy, alkoxy, mercapto, cycloalkyl, substituted cycloalkyl, heterocyclic, substituted heterocyclic, aryl, substituted aryl, heteroaryl, substituted heteroaryl, aryloxy, substituted aryloxy, halogen, cyano, nitro, amino, amido, —C(O) H, acyl, oxyacyl, carboxyl, sulfonyl, sulfonamide, sulfuryl, and the like. The prefix "hetero" indicates that one or more carbon atoms in the group have been replaced with a different atom. In one embodiment, the groups have from one to about 100 carbon atoms.

The term "active" when referring to a layer or material is intended to mean a layer or material that exhibits electronic or electro-radiative properties. An active layer material may emit radiation or exhibit a change in concentration of electron-hole pairs when receiving radiation. The term "active material" refers to a material which electronically facilitates the operation of the device. Examples of active materials include, but are not limited to, materials which conduct, inject, transport, or block a charge, where the charge can be either an electron or a hole. Examples of inactive materials include, but are not limited to, planarization materials, insulating materials, and environmental barrier materials.

The term "alkyl" is intended to mean a group derived from an aliphatic hydrocarbon and includes a linear, a branched, or a cyclic group, which may be unsubstituted or substituted.

As used herein, "alkoxy" refers to the moiety —O-alkyl. The term "alkyl" is intended to mean a group derived from an aliphatic hydrocarbon having one point of attachment. The term "aromatic heterocycle" refers to a moiety having at least one aromatic ring containing one or more heteroatoms (e.g., N, O, S, or the like) as part of the ring structure. In one embodiment, the aromatic heterocycle has in the range of 5 up to 14 carbon atoms.

The term "alkylene" is intended to mean a group derived from an aliphatic hydrocarbon and having two or more points of attachment.

The term "alkenyl" is intended to mean a group derived from a hydrocarbon having one or more carbon-carbon double bonds and having one point of attachment. The term "alkynyl" is intended to mean a group derived from a hydrocarbon having one or more carbon-carbon triple bonds and having one point of attachment.

The term "aryl" is intended to mean a group derived from an aromatic hydrocarbon having one point of attachment. The term "arylene" is intended to mean a group derived from an aromatic hydrocarbon having two points of attachment.

The term "arylalkyl" is intended to mean a group derived from an alkyl group having an aryl substituent. The term "alkylaryl" is intended to mean a group derived from an aryl group having an alkyl substituent.

The term "cycloalkyl" refers to ring-containing alkyl groups containing in the range of about 3 up to 8 carbon atoms, and "substituted cycloalkyl" refers to cycloalkyl groups further bearing one or more substituents as set forth above.

The term "thioalkyl" refers to the moiety —S-alkyl, wherein alkyl is as defined above, and "substituted thioalkyl" refers to thioalkyl groups further bearing one or more substituents as set forth above.

The term "aminoalkyl" refers to the moiety —N(R)$_2$, wherein at least one R is alkyl, and "substituted aminoalkyl" refers to aminoalkyl groups further bearing one or more substituents as set forth above.

The term "oxyalkylene" is intended to mean an alkyl group, having two points of attachment, wherein at least one methylene unit has been replaced with an oxygen atom.

The term "polymer" is intended to mean a material having at least one monomeric unit. The term includes homopolymers having only one kind of monomeric unit, and copolymers having two or more different monomeric units. Thus, in some embodiments, the inventive polymer is a homopolymer; in other embodiments, it is a copolymer.

The term "block polymer" is intended to mean a material composed of block macromolecules.

The term "block macromolecules" is intended to mean a macromolecule which is composed of blocks in linear sequence.

The term "block" is intended to mean a portion of a macromolecule, comprising many constitutional units, that has at least one feature which is not present in the adjacent portions.

The term "graft polymer" is intended to mean a material composed of macromolecules with one or more species of blocks connected to the main chain as side chains, these side chains having constitutional or configurational features that differ from those in the main chain.

As used herein, the term "conjugated", when referring to a polymer, means that the main chain of the polymer includes a plurality of carbon-carbon double bonds separated from each other by carbon-carbon single bonds.

The term "substrate" is intended to mean a workpiece that can be either rigid or flexible and may include one or more layers of one or more materials, which can include, but are not limited to, glass, polymer, metal, or ceramic materials, or combinations thereof.

As used herein, the term "composition" includes a solvent, a processing aid, a charge transporting material, a charge clocking material, or combinations thereof.

The term "layer" is used interchangeably with the term "film" and refers to a coating covering a desired area. The area can be as large as an entire device or a specific functional area such as the actual visual display, or as small as a single sub-pixel. Films can be formed by any conventional deposition technique, including vapor deposition and liquid deposition. Liquid deposition techniques include, but are not limited to, continuous deposition techniques such as spin coating, gravure coating, curtain coating, dip coating, slot-die coating, spray-coating, and continuous nozzle coating; and discontinuous deposition techniques such as ink jet printing, gravure printing, and screen printing.

The term "organic electronic device" is intended to mean a device including one or more semiconductor layers or materials. Organic electronic devices include, but are not limited to: (1) devices that convert electrical energy into radiation (e.g., a light-emitting diode, light emitting diode display, diode laser, or lighting panel), (2) devices that detect signals through electronic processes (e.g., photodetectors photoconductive cells, photoresistors, photoswitches, phototransistors, phototubes, infrared ("IR") detectors, or biosensors), (3) devices that convert radiation into electrical energy (e.g., a photovoltaic device or solar cell), and (4) devices that include one or more electronic components that include one or more organic semiconductor layers (e.g., a transistor or diode). The term also includes, but is not limited to, a memory storage device, an antistatic film, a biosensor, an electrochromic device, a solid electrolyte capacitor, an energy storage device, an electromagnetic shield, or any combination thereof.

Group numbers corresponding to columns within the periodic table of the elements use the "New Notation" convention as seen in the CRC *Handbook of Chemistry and Physics*, 81st Edition (2000), where the groups are numbered from left to right as 1-18.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

The phrase "X is selected from A, B, and C" is equivalent to the phrase "X is selected from the group consisting of A, B, and C", and is intended to mean that X is A, or X is B, or X is C. The phrase "X is selected from 1 through n" is intended to mean that X is 1, or X is 2, . . . or X is n.

Also, use of "a" or "an" are employed to describe elements and components of the invention. This is done merely for convenience and to give a general sense of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which the invention belongs. Although methods and materials similar or equivalent to those described herein can be used in the practice or testing of the polymers, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the organic light-emitting diode display, photodetector, photovoltaic, and semiconductive member arts.

EXAMPLES

The concepts described herein will be further described in the following examples, which do not limit the scope of the invention described in the claims.

Example 1

Synthesis of poly-(2-methoxy-5-(3,7-dimethyloctyloxy)-phenylenevinyl-co-thioihenevinylene) (alternating)

To a mixture of 2.0 g (2.25 mmol) 2-methoxy-5-(3,7-dimethyloctoxy)-p-xylenebis(triphenylphosphonium chloride) and 316 mg (1 equivalent) 2,5-thiophenedialdehyde in 20 ml chloroform and 10 ml ethanol, was added 8 ml t-BuOK 1 M solution in THF at room temperature. The mixture was then stirred for 48 hours under nitrogen at room temperature. After precipitation from 500 ml of methanol, the red polymer solid was isolated by filtration. The polymer was then washed with 500 ml methanol and dried. Purification was performed by dissolving the crude polymer in 10 ml of THF, passing the solution through a 5 µm filter, and then precipitating polymer from 500 ml water. The polymer was isolated by filtration and washed alternatively by water and methanol, then dried in vacuo. Yield 560 mg.

Proton NMR verified the polymer structure.
$^1$H-NMR (500 MHz, CDCl$_3$) δ ppm, 6.4-7.4 (br, 8H, H-phenyl, H-thiophene, H-vinylene), 3.4-4.2 (br, 5H, OCH$_3$, —OCH$_2$—), 0.7-2.0 (br, 19H, —CH=, —CH$_2$—, and CH$_3$ on alkyl group)

Example 2

Synthesis of poly-(2-methoxy-5-(3,7-dimethyloctyloxy)-phenylenevinylene-co-thiophenevinylene) (alternating)

To a mixture of 2.0 g (2.25 mmol) 2-methoxy-5-(3,7-dimethyloctoxy)-p-xylenebis(triphenylphosphonium chloride) and 316 mg (1 equivalent) 2,5-thiophenedialdehyde in 25 ml DMAc, was added 640 mg t-BuOLi at room temperature. The mixture was then stirred at room temperature for 30 minutes and then 14 hours under nitrogen at 100° C. The rest of the procedure is the same as in Example 1. Yield 630 mg.

Example 3

Synthesis of poly-(2-methoxy-5-(3,7-dimethyloctyloxy)-phenylenevinylene-co-thiophenevinylene) (alternating)

To a mixture of 2.0 g (2.25 mmol) 2-methoxy-5-(3,7-dimethyloctoxy)-p-xylenebis(triphenylphosphonium chloride) and 316 mg (1 equivalent) 2,5-thiophenedialdehyde in 25 ml DMAc, was added 8 ml t-BuOK 1 M solution in THF at room temperature. The mixture was then stirred at room temperature for two hours and then 14 hours under nitrogen at 100° C. The rest of the procedure is the same as in Example 1. Yield 600 mg.

Example 4

Synthesis of poly-(2-methoxy-5-(3,7-dimethyloctyloxy)-phenylenevinylene-co-dihexyloxythiophenevinylene) (random)

To a mixture of 237 mg (0.66 mmol) 2-methoxy-5-(3,7-dimethyloctyloxy)-p-xylenedichloride and 370 mg (1 equivalent) 3,4-dihexoxy-2,5-di(phenylsulfinylmethyl)-thiophene in 30 ml THF, was added 5.3 ml tBuOK 1 M solution in THF at room temperature. The mixture was then stirred at room temperature for 1 hour followed by refluxing for 2 hours under nitrogen. Then the solvent was evaporated and to the residue 200 ml of methanol was added. Polymer was isolated by filtration and washed repeatedly by water and methanol and dried in vacuo. Yield 150 mg.

Proton NMR verified the polymer structure. $^1$H-NMR (500 MHz, CDCl$_3$, ppm): δ 7.49 and 7.35 (s, aromatic protons), 4.09-4.05 (br, vinyl protons), 3.52 (s, —OCH$_2$—), 0.70-1.93 (br & m, alkyl protons).

Example 5

Synthesis of poly(dihexyloxythiophenevinylene)

To a solution of 530 mg of 3,4-dihexoxy-2,5-di(phenylsulfinylmethyl)thiophene in 5 ml THF, a 1 M solution of tert-BuOK in THF was added. The first 1 equivalent was added within five minutes and followed by the remaining 3 equivalent of the base. The mixture was then stirred at room temperature for 14 hours. After the solvent evaporated, 250 ml of methanol was added to the residue. The polymer was collected by filtration, washed thoroughly by water and methanol and dried. Yield 180 mg. The structure was confirmed by proton NMR.

$^1$H-NMR (500 MHz, CDCl$_3$, ppm): δ 4.03 (br, vinyl protons), 3.50 (s, —OCH$_2$—), 0.75-1.78 (br & m, alkyl protons).

Example 6

UV-vis measurements were carried out for both solution and film for the above polymers to determine the optical band gap. The data for the onset of the absorption are listed in Table 1.

TABLE 1

| Polymer | Band gap(solution), nm | Band gap(film), nm |
| --- | --- | --- |
| Example 1 | 620 | 620 |
| Example 4 | 650 | 650 |
| Example 5 | 700 | 700 |

Example 7

Devices were fabricated in anode/Example 1/PCBM/cathode configuration on glass substrates. PCBM is a fullerene derivative with improved solubility in common organic solvents such as toluene. A visible transparent ITO (indium-tin-oxide) coating was used as the anode electrode. Al and Ca were used as the cathode. Forward bias is defined as the higher potential biased to the anode side (unless otherwise noted).

Spectral response of this device was taken at zero bias (V=0 V). It is shown in FIG. 1. A broad response in the visible spectral region was revealed. The photosensitivity at 520 nm was reached around 130 mA/Watt, corresponding to a quantum efficiency of 31%. The photocurrent/dark-current ratio is over $10^5$ (under illumination of a few mW/cm2), comparable to the number observed in best polymer photodetector demonstrated. These data suggest that polymers of Example 1 have good carrier mobility and are good candidates for photovoltaic cells and photodetectors for energy conversion and photosensing applications.

Example 8

Figure 2:
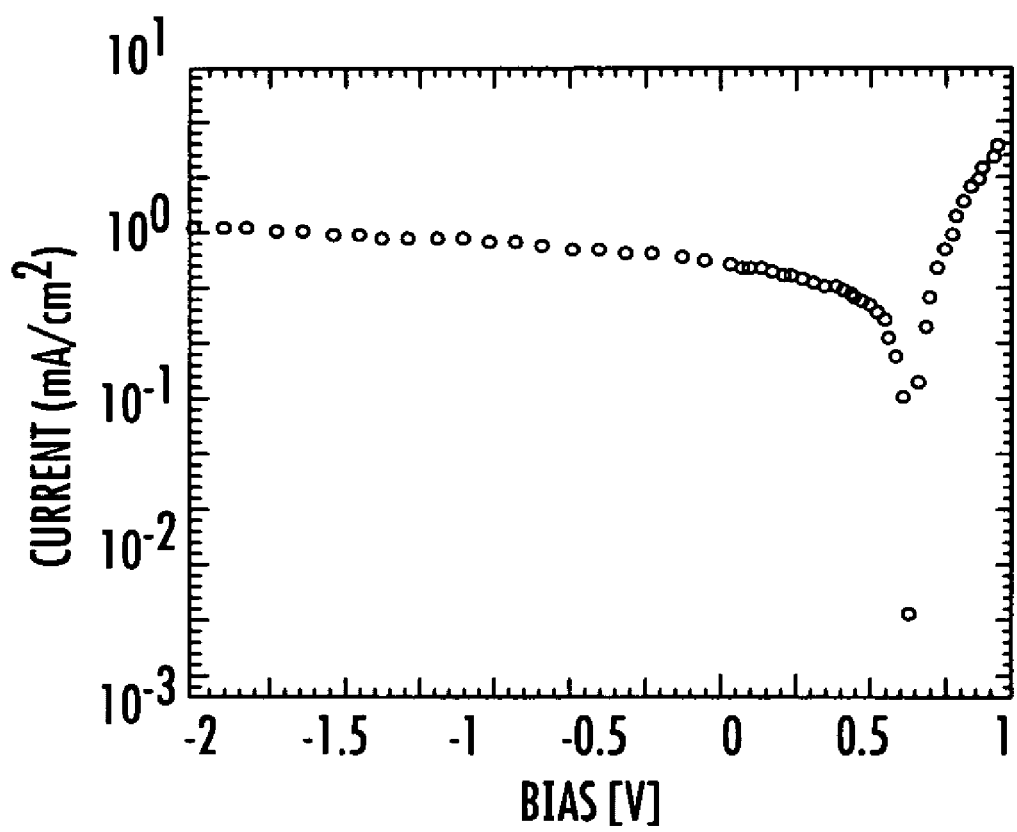
FIG. 2 illustrates the I-V characteristics under white light illumination with a conjugated copolymer.

Devices were fabricated in configuration similar to that used for I-V characteristic measurements were carried out under light illumination. A data set taken under 7 mW/cm² broad-band visible light is shown in FIG. 2. The current is shown in absolute value. The short circuit current (V=0 bias) was 0.54 mA/cm², and the open circuit voltage (V at 1=0) is 0.65V. The photosensitivity increases with reverse bias, to −1.0 mA/cm² at −2 V bias. The photosensitivity (defined as $I_{SC}/L_{in}$) under white light illumination is thus approximately 80 mA/Watt at zero bias and ~145 mA/Watt at −2 V bias.

These data suggest that the photosensitivity of these polymer photosensors can be adjusted by biasing voltage. Higher photosensitivity can be achieved by applying reverse bias.

Example 9

Photodiodes were fabricated using Example 4 and Example 5 in the similar configuration as in Example 7.

Figure 3:
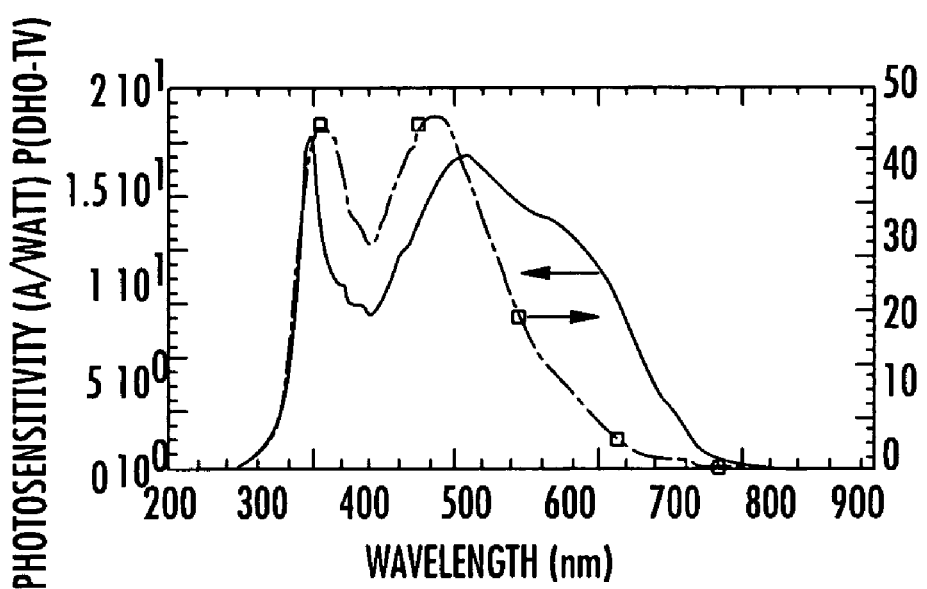
FIG. 3 illustrates the spectral response at zero bias (V=0 V) for a device using a conjugated copolymer and a conjugated homopolymer.

Spectral responses of these devices were taken at zero bias (V=0 V) and are shown in FIG. 3. Compared with the alternating copolymer, the spectral response in visible spectral region was red shifted for both Example 4 and Example 5 polymers. For Example 5, the photoresponse covers the entire visible region including the deep red region from 650 to 700 nm. The spectral coupling of the photovoltaic cells with this polymer is significantly improved comparing to that made with PPV or polythiophene. This material is also suitable for fabricating sensor pixels for full-color image sensors in which the spectral response of the red color pixels should cover 600-700 nm.

This example suggests that Example 4 and Example 5 have good photosensitivity and are promising candidates for photovoltaic cells and photosensor applications.

Example 10

Figure 4:
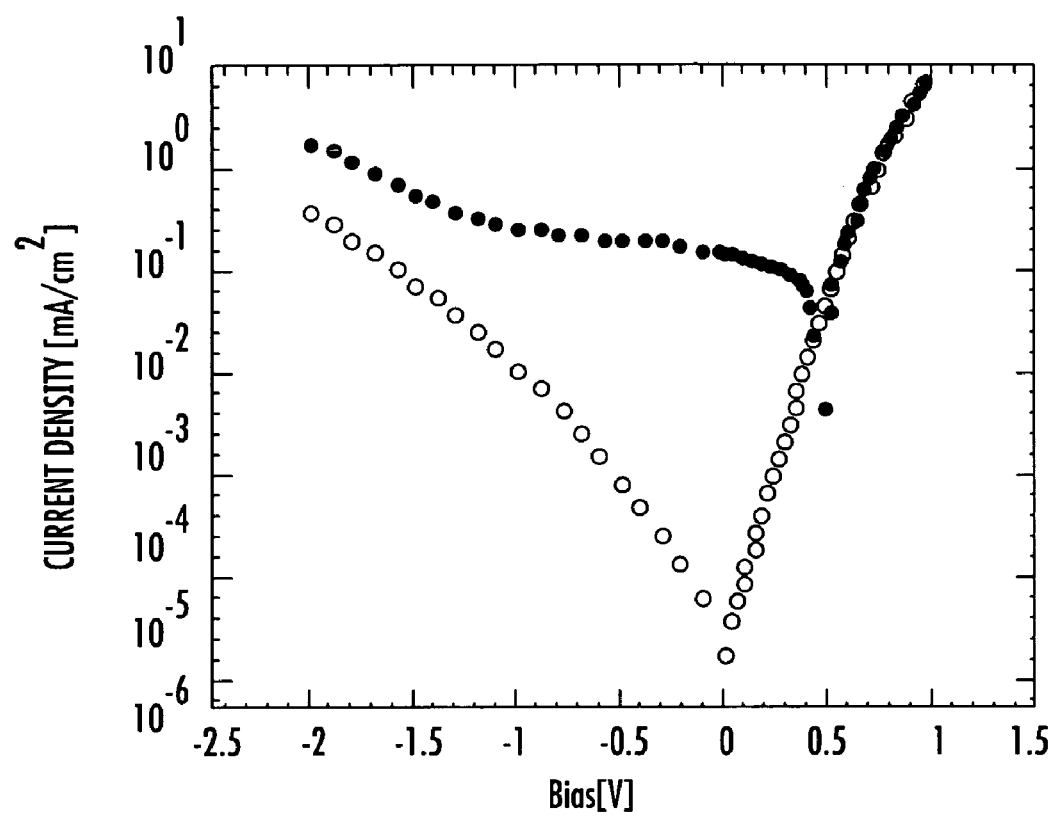
FIG. 4 illustrates the I-V characteristics under white light illumination for a device fabricated with a conjugated homopolymer and a conjugated copolymer.

Devices were fabricated in configuration similar to that for Example 9. I-V characteristic measurement was carried out under light illumination. The data sets taken under broad white light are shown in FIG. 4 for Example 5 (the upper curve) and Example 4 (the lower curve). The photocurrent is shown in absolute value. The short circuit current, the open circuit voltage and the photosensitivity for white light excitation are listed in Table 2. Experimental results from devices with different polymer thickness suggest that the photosensitivity can be further improved by optimizing the film thickness.

TABLE 2

| Polymer | Short circuit current (mA/cm² at V = 0) | Open circuit voltage (V at 1 = 0) | Photosensitivity ($I_{SC}/L_{in}$, |
| --- | --- | --- | --- |
| Example 4 | 1.46 E−1 | 0.53 | 20.9 |
| Example 5 | 8.85 E−2 | 0.50 | 12.6 |

Example 11

Figure 5:
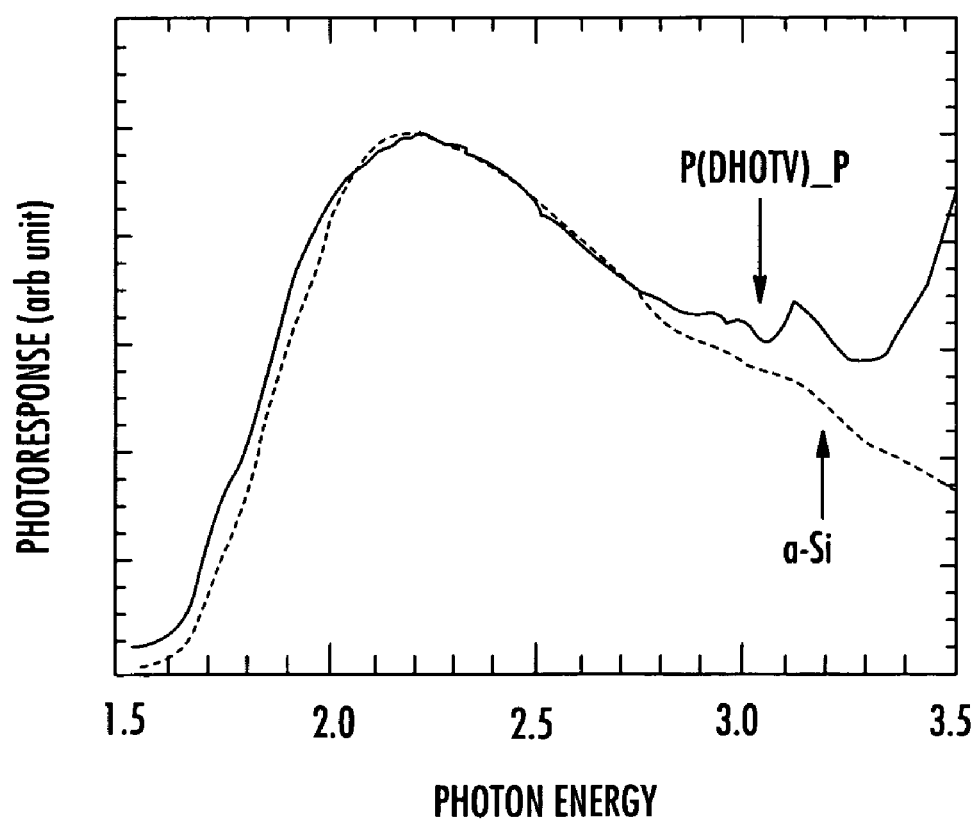
FIG. 5 illustrates a photoresponse comparison between a device made with a conjugated homopolymer and a photovoltaic cell made with amorphous silicon.

Devices were fabricated in configuration as in Example 9. FIG. 5 compares the photoresponse of a device made with Example 5 with a photovoltaic cell made with amorphous silicon. The band gap of Example 5 is even smaller than that of amorphous silicon. The spectral coupling is thus even better than that of a-Si photovoltaic cells.

Example 12

Example 1 was dissolved in toluene.

Figure 6:
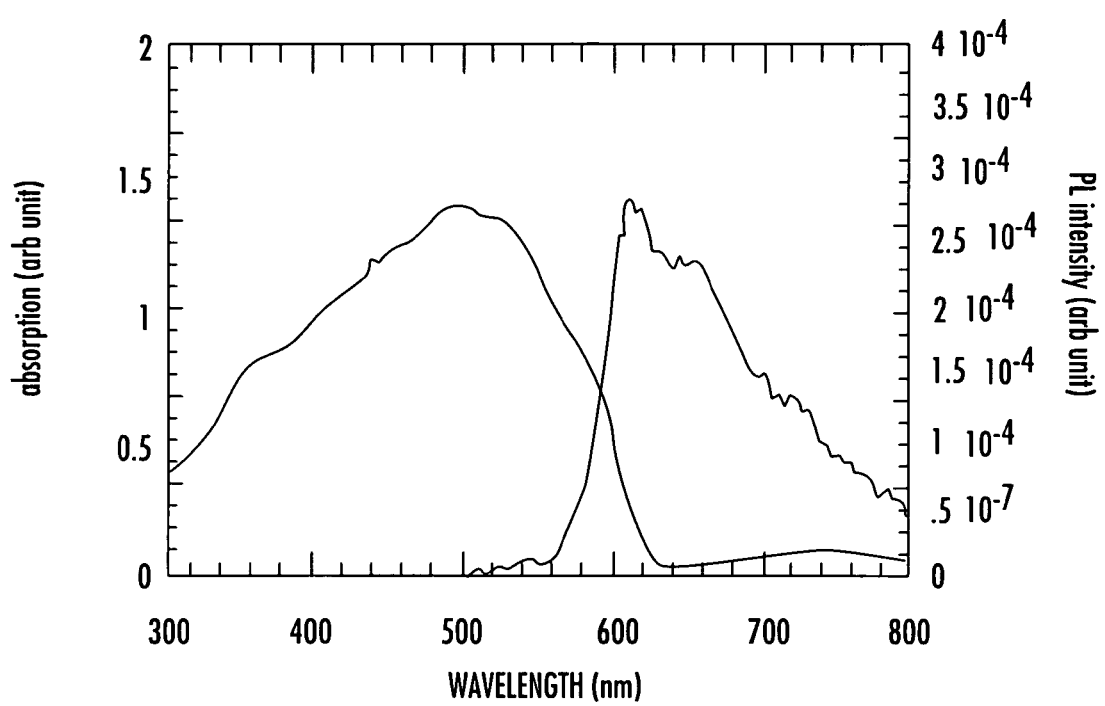
FIG. 6 illustrates absorption and photoluminescence spectra of a conjugated copolymer thin film.

Typical concentration for film deposition is 10-50 mg/ml. High quality, pinhole-free films were obtained by spinning at 1000-2000 rpm. Typical film thickness was in the range of 50-500 nm. Absorption and photoluminescence spectra were taken and are shown in FIG. 6. Significant photoluminescence was observed in solution.

Example 13

Figure 7:
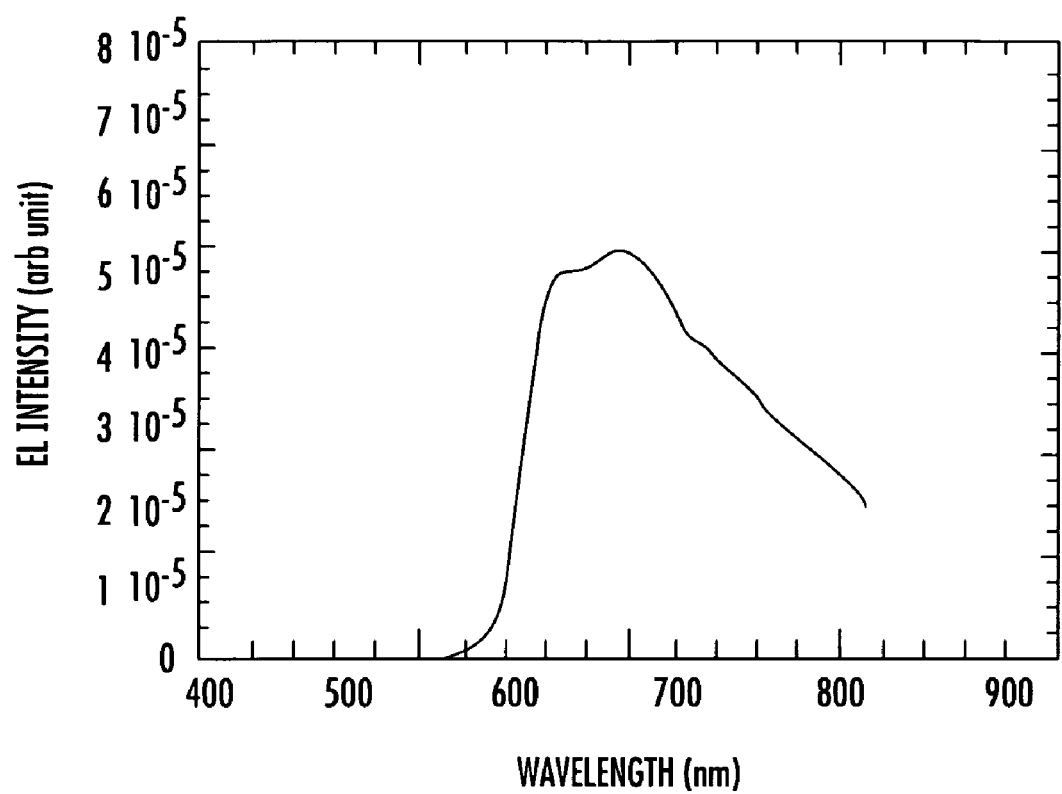
FIG. 7 illustrates the emission spectrum for a LED device fabricated with a conjugated copolymer.

Light emitting devices were fabricated in a sandwich configuration in the following order: glass/ITO/CP/Example 1/Ca. Conducting PANI and PEDOT were used for the CP layer. Light emission was observed under a forward bias larger than 2V. The emission spectrum was tested and is shown in FIG. 7. The emission band is from 600 nm to 780 nm, which covers both the red zone (600-700 nm) and extends to the infrared region (λ>700 nm).

This example demonstrated that Example 1 can be used for light emission applications. In addition to flat panel displays using visible emission property, the infrared emission can be used for emitters used for optocommunication applications.

Example 14

Figure 8:
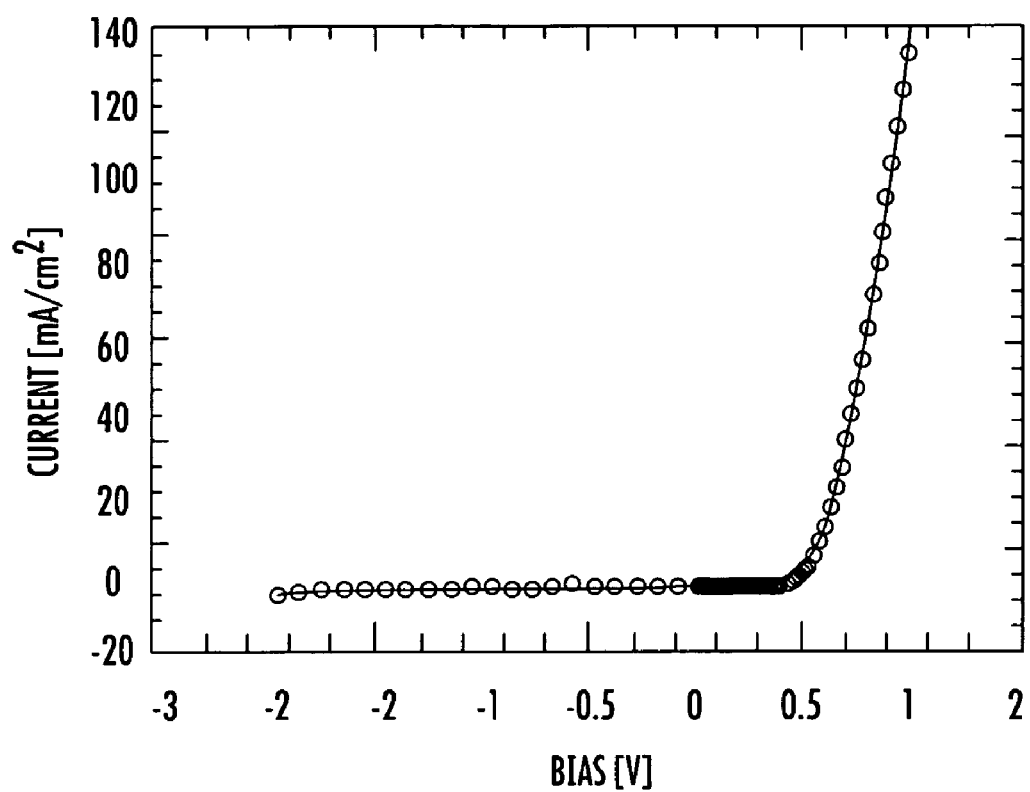
FIG. 8 illustrates I-V characteristics in the absence of light for a device fabricated with a conjugated copolymer.

Switch diode devices were fabricated on glass substrate with the following configuration: anode/Example 1/PCBM/cathode configuration on glass substrates. ITO and Au were used for anode electrode. Al and Ca were used as the cathode electrode. The typical I-V characteristic in absence of light is shown in FIG. 8. The dark current at 1 V bias is over 120 mA/cm$^2$, the best number even seen in polymer devices. It is even comparable to that made with inorganic diode. The device current at near zero bias was ~10 mA/cm$^2$, which is seven orders of magnitude lower than that at 1 V bias; i.e., the current switch ratio is as large as 10$^7$.

These data demonstrate that the I-V characteristic is strongly anisotropy with the bias polarity; i.e., a rectifier (diode) behavior. Devices with such I-V characteristic can be used as switching diodes: "ON" state can be achieved by applying forward bias to the diodes anode, "OFF" state can be achieved when the diodes are biased at zero or reverse bias.

It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The invention claimed is:

1. A polymer, wherein the polymer is poly-(2-methoxy-5-(3,7-methyloctyloxy)-phenylenevinylene-co-dihexyloxythiophenevinylene).

2. A polymer, wherein the polymer is poly-(2-methoxy-5 (3,7-dimethyloctyloxy)-phenylenevinylene-co-thiophenevinylene.

* * * * *